May 25, 1926.　　　　　　　　　　　　　　　　1,585,867
C. C. KRUSE
RECORDING AND DETECTING SYSTEM
Filed June 27, 1923　　6 Sheets-Sheet 1
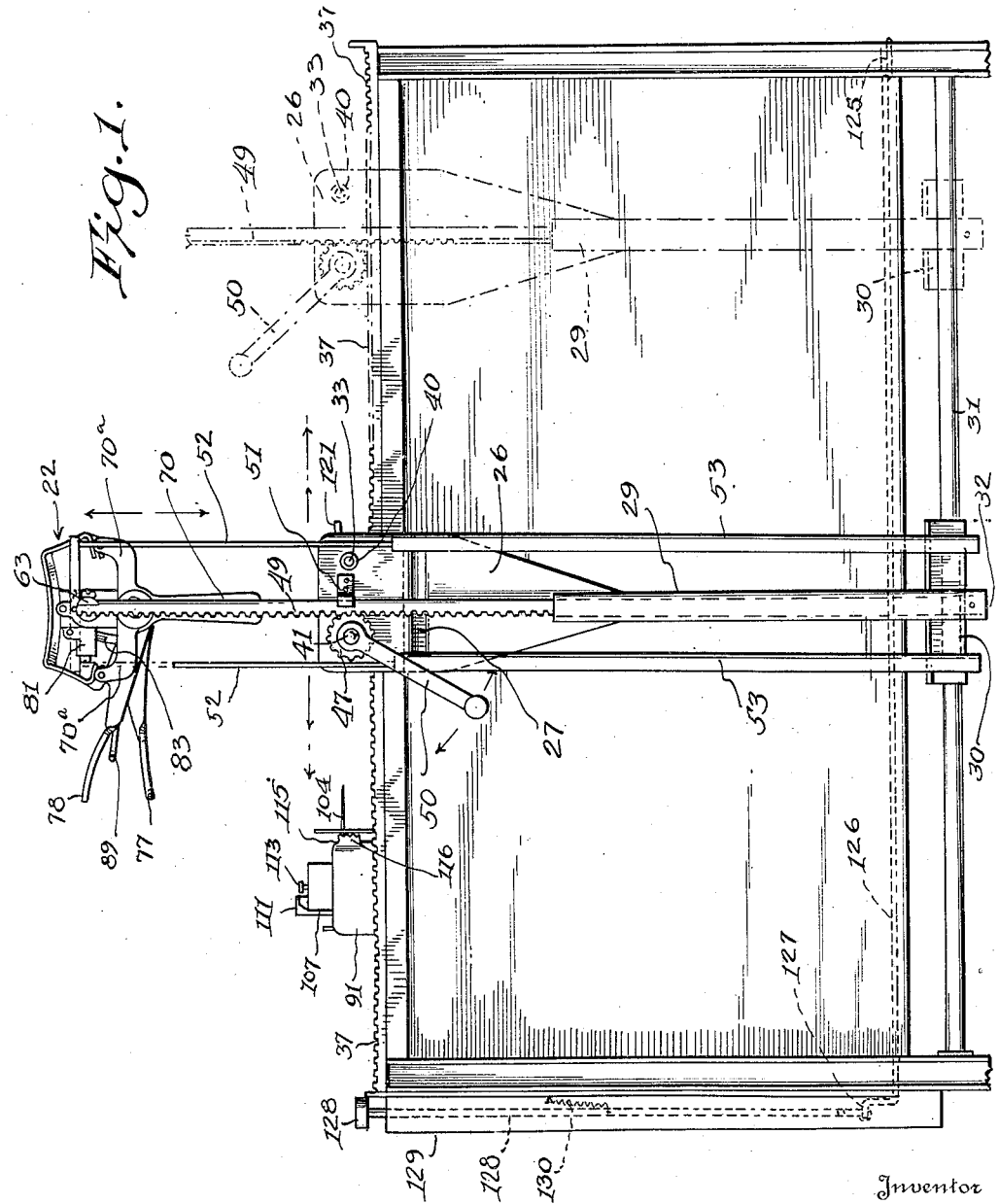
Inventor
C. C. Kruse
By
Attorney May 25, 1926.
C. C. KRUSE
1,585,867
RECORDING AND DETECTING SYSTEM
Filed June 27, 1923   6 Sheets-Sheet 2
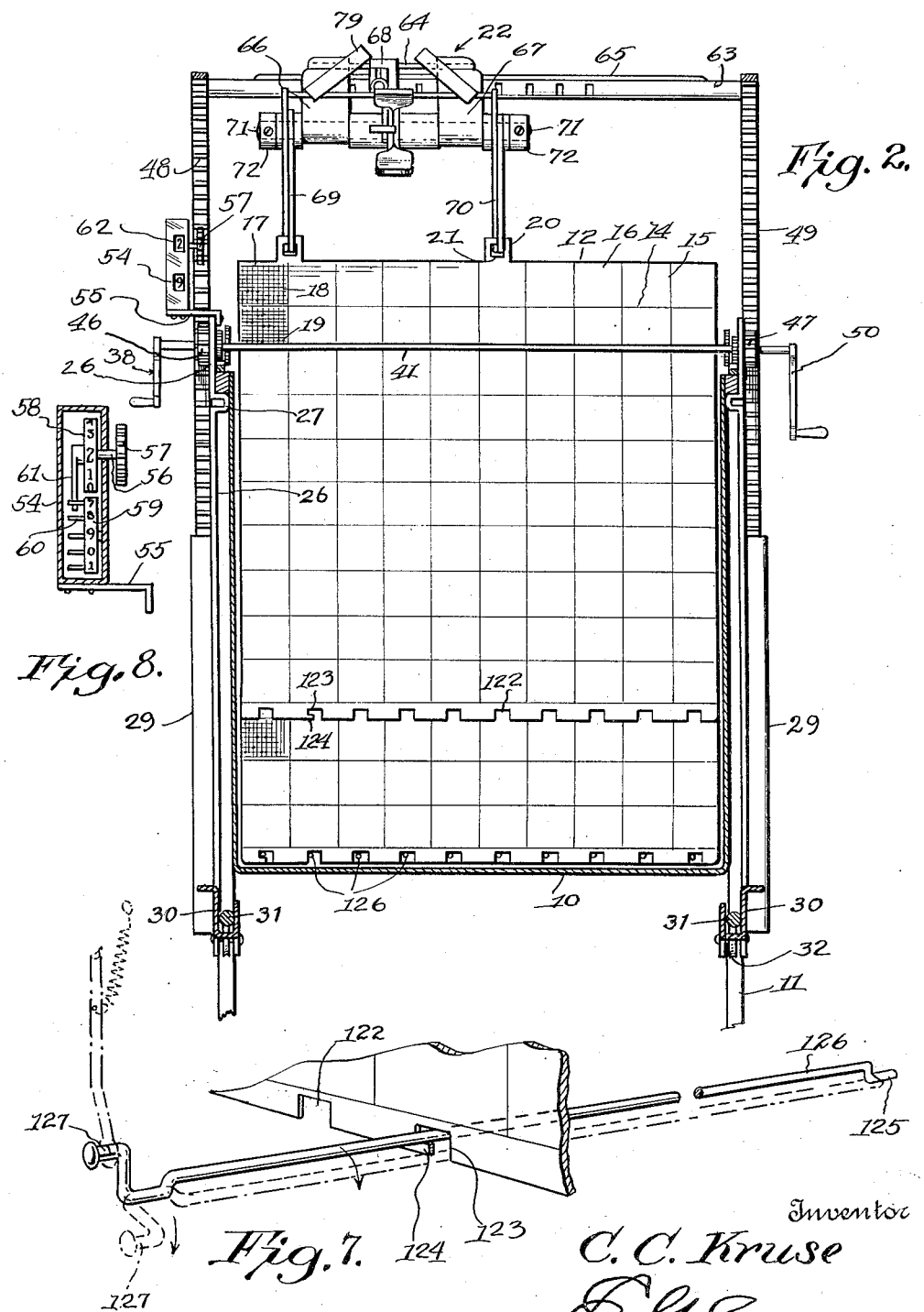

May 25, 1926.  
C. C. KRUSE  
1,585,867  
RECORDING AND DETECTING SYSTEM  
Filed June 27, 1923  6 Sheets-Sheet 3

May 25, 1926.                                                                1,585,867
C. C. KRUSE
RECORDING AND DETECTING SYSTEM
Filed June 27 1923     6 Sheets-Sheet 4
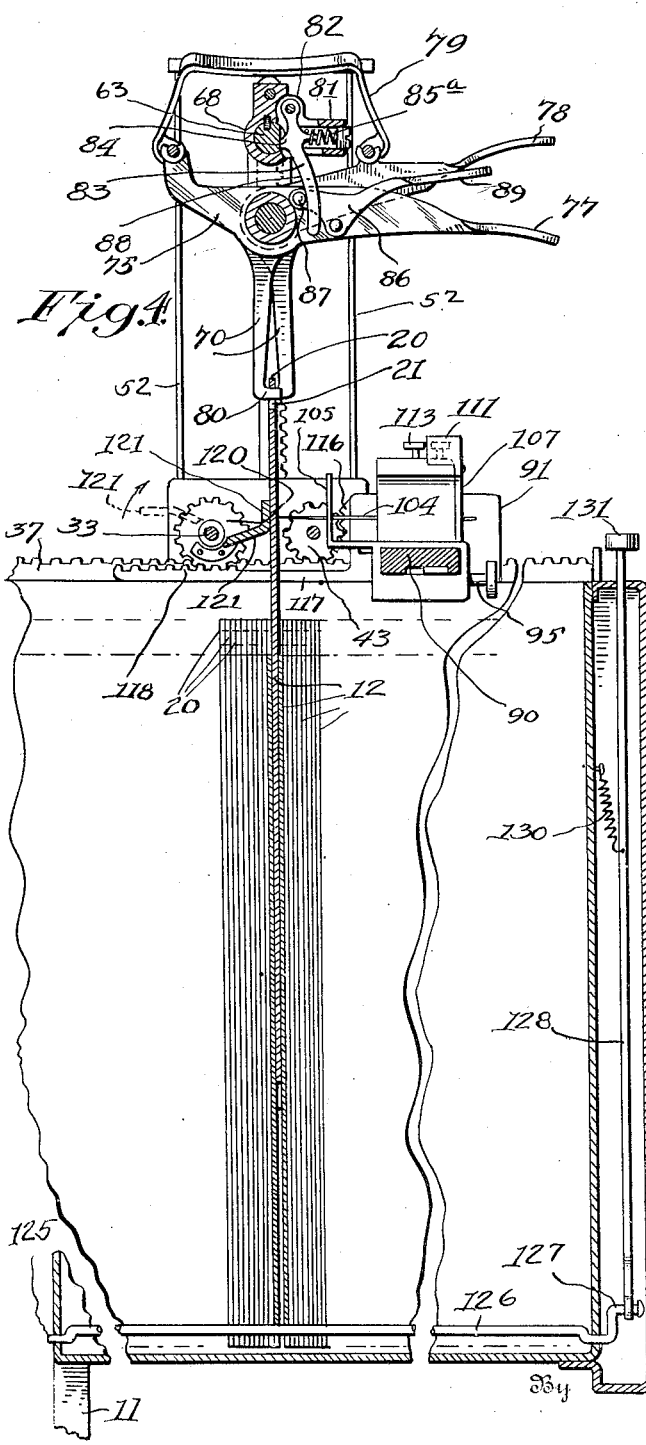
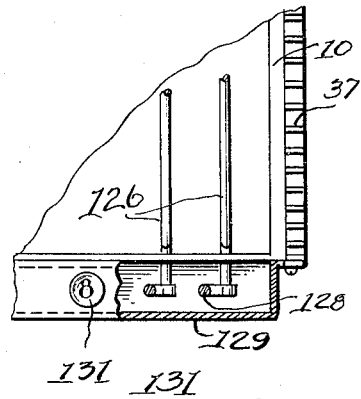
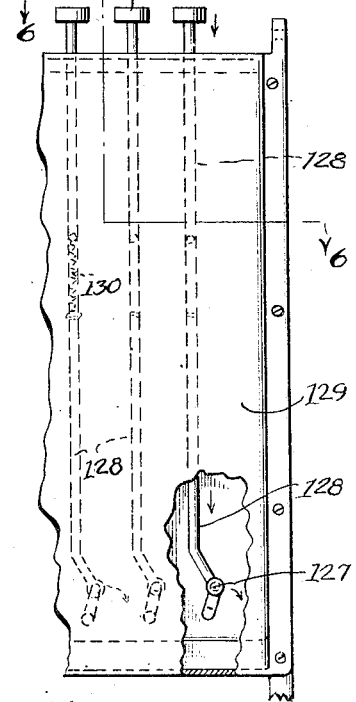
Fig. 4.
Fig. 5.
Fig. 6.
Inventor
C. C. Kruse

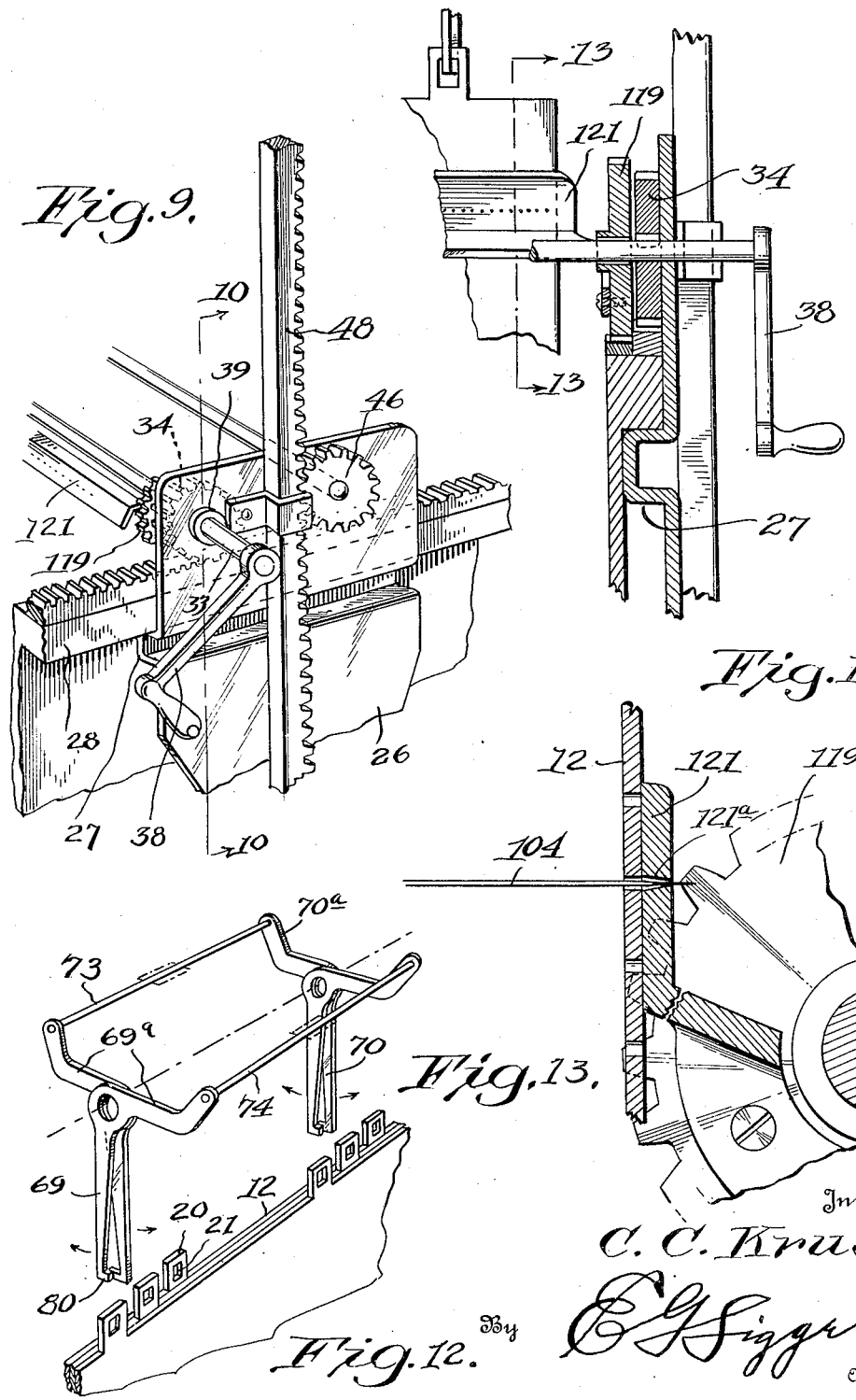

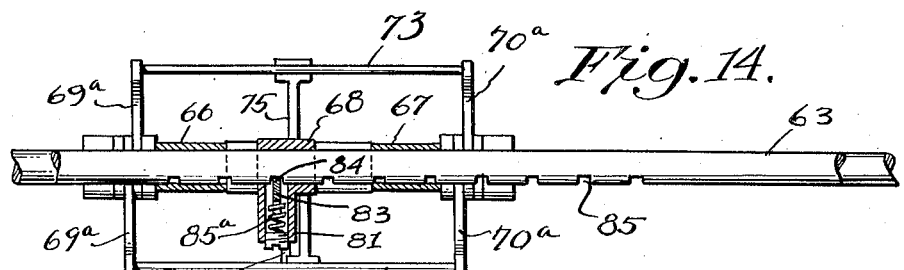
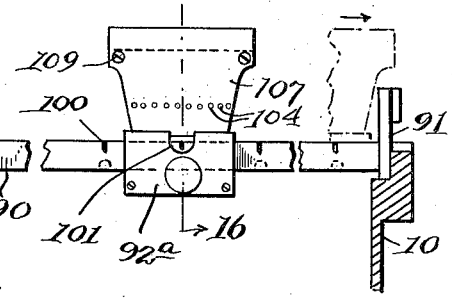
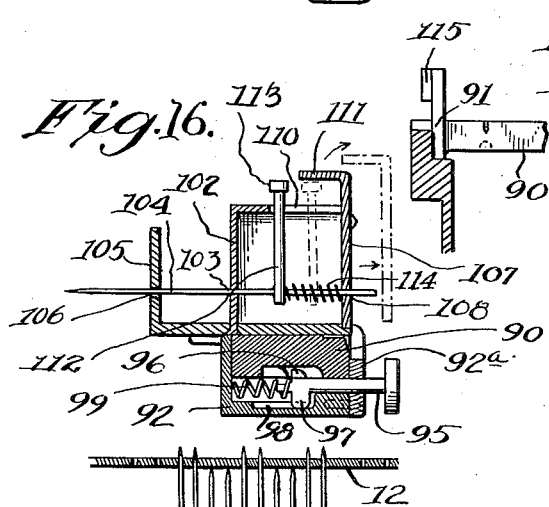
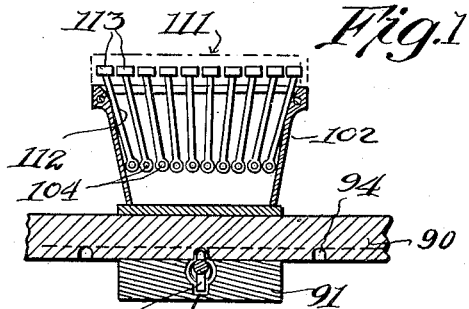
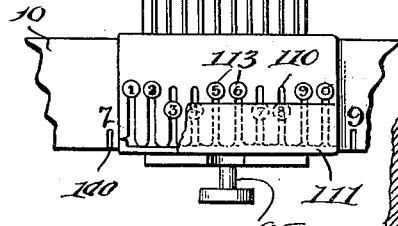
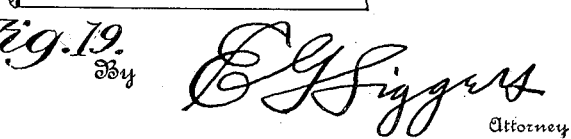

Patented May 25, 1926.

1,585,867

UNITED STATES PATENT OFFICE.

CHARLES C. KRUSE, OF MODESTO, CALIFORNIA.

RECORDING AND DETECTING SYSTEM.

Application filed June 27, 1923. Serial No. 648,145.

This invention relates to a recording and detecting system, by means of which a record may be kept of a great many numbers which may be automobile licenses, serial numbers of paper currency, bonds or other securities or serial numbers denoting any other articles in connection with which it is desired to keep certain data in concise form for ready reference.

In connection with automobiles, for instance, it is desirable to have some means by which a policeman seeing an automobile, that for some reason he may suspect has been stolen, may immediately determine whether or not his suspicions are warranted. Also in the banking business it is desirable, in case stolen currency or negotiable securities are presented, to have some records by means of which the same may be at once identified, and the wrongful possessor apprehended.

The general object of the present invention is to provide a practical device of the character above set forth, which will take up only a small space, and will be simple in its construction, whereby it may be quickly, easily and accurately manipulated.

More specifically stated, the invention includes a series of leaves or thin sheets of metal or other suitable material of uniform thickness, each leaf being divided and subdivided by tens, in accordance with our decimal system of notation, each subdivision containing the required information with regard to an article bearing a certain serial number. These leaves may be arranged in groups of ten to form books, and the books may be arranged in groups of ten to form ledgers, and so on. The entire system may be built to contain any desired number of records, the total number usually being a predetermined power of ten.

The leaves, books or ledgers are preferably arranged in a box and a selector used in combination therewith, by means of which any predetermined leaf may be accurately selected, and raised above the others. The desired information is recorded in the subdivision which corresponds to the serial number to which the information relates, by means of perforations, dots or other characters and a detector is associated with the selector in such a manner that the desired relation between the selector and the detector may be effected according to appropriate meters or gages, so that the detector is brought into cooperation with the subdivision bearing the information desired, and may be readily manipulated to read or interpret the same.

The mechanism by which the invention is embodied will be better understood from the following detailed description taken in connection with the accompanying drawings which illustrate in detail one form of the invention, and its mode of operation.

In the drawings:

Figure 1 is a side elevation of the invention.

Figure 2 is a vertical cross section thereof, showing one leaf partly raised by the selector.

Figure 3 is a plan view of the invention.

Figure 4 is a longitudinal section through a part of the invention taken on the line 4—4 of Figure 3.

Figure 5 is a front elevation of a portion thereof, showing a part of the leaf locking and releasing plungers.

Figure 6 is a sectional detail on the line 6—6 of Figure 5.

Figure 7 is a perspective view of a portion of the leaf-locking mechanism.

Figure 8 is a detailed sectional view of the meter for measuring the elevation of a leaf.

Figure 9 is a perspective detailed view of a portion of the mechanism for positioning the selector longitudinally and vertically with respect to the box.

Figure 10 is a detailed sectional view on the line 10—10 of Figure 9.

Figure 11 is a detailed plan view of the gage for determining the position of the selector longitudinally.

Figure 12 is a perspective magnified view showing the selector jaws detached, and their relation to leaves.

Figure 13 is a sectional detailed view on the line 13—13 of Figure 10.

Figure 14 is a horizontal section through the selector showing means for positioning it laterally of the box.

Figure 15 is a front elevation of the detector.

Figure 16 is a sectional view taken on the line 16—16 of Figure 15.

Figure 17 is a vertical sectional view taken at right angles to the plane of Figure 16.

Figure 18 is a plan view of the detector.

Figure 19 is a perspective detailed view of the track on which the detector is adjustably mounted.

Referring in detail to the drawings, the invention comprises a box 10, herein shown as rectangular in shape, supported by legs 11 and having an open top, and containing a series of leaves or plates 12 arranged in the manner of a card index. These leaves are made from sheet metal, or other durable material, of uniform thickness, and are held accurately in the proper position within the box 10 by cleats or lugs 13 secured to the inner side walls of the box.

Each leaf is divided by a series of horizontal lines 14 and vertical lines 15 into a plurality of square or rectangular spaces 16. The number of these spaces may of course vary according to the specific use for which the invention is designed, but usually there will be ten horizontal rows and ten vertical rows of these spaces, or divisions of each leaf, thus making 100 squares to correspond to our decimal system of notation.

In the present form of the invention, which is designed particularly for recording certain data in regard to automobiles and arranged according to their license numbers, each of the squares 16 will be provided with ten equally spaced horizontal lines 17 and a number of vertical lines 18. Each horizontal line 17 represents a license number, and the intersections of the lines 18 therewith form points in connection with which the desired information may be recorded by perforations 19. By selecting any one of the intersections between lines 17 and 18, or by selecting a plurality of intersections in groups of 2, 3, 4 and the like, a vast number of different combinations may be obtained. Of course, the number of vertical lines 18 may be provided which will furnish a sufficient number of combinations to give the desired information, usually ten of such lines to each square will be sufficient to record the desired data as to the type of car properly bearing the given license number, the year it was manufactured, and whether or not is has been stolen. The different combinations of perforations will be punched on each of the lines 17 representing a given license number in accordance with a certain predetermined code, which will be uniformly used throughout the entire system. In the case of bonds, currency and the like each serial number may be represented by a single intersection, a perforation at that point indicating that it is stolen. Ten thousand bonds may thus be recorded on a single leaf.

It will be noted, that as shown herein, each leaf is divided into one hundred squares, and each square contains ten of the lines 17 so that the records of one thousand automobiles may be contained on each leaf. Ten of these leaves will form what may be termed a book, ten books form what may be termed a ledger, and ten ledgers may be termed a unit and one book, ledger or unit, or more than one, as required for certain records, may be contained within a small box. For example, if the leaves are one hundredth of an inch in thickness, one thousand leaves may be contained in a box ten inches long, thus providing for recording one million license numbers.

Each leaf is provided with a pair of upwardly projecting tabs 20, each having an opening 21 for engagement by a selector 22, which will be hereinafter more particularly described. When it is desired to refer to the record of a certain license number having six digits, the first digit will determine the ledger, the second digit the book, the third digit the leaf on which the record will be found, the fourth digit will determine the column on the leaf, the fifth digit the horizontal row, and the last digit the horizontal line 17 which contains the record desired. The selector will then be operated to engage in the holes 21 of the tabs 20 on the leaf which bears the desired line 17 and raise it to the proper height, and the detector, hereinafter described, will be moved laterally to the proper column, and then operated to determine the combination of perforations forming said record.

In order that the selector may be accurately position longitudinally of the box, one side of the box is provided on its upper edge with a gage 23. The longer division marks 24 on the gage are spaced apart to measure the thickness of one hundred leaves, while the distance between the smaller subdivisions 25 measures the thickness of ten leaves. Owing to the space necessarily occupied by the selector jaws, it is impracticable to gage the longitudinal position thereof accurately enough to measure the thickness of a single leaf. The tabs 20 of the leaves of each book are therefore offset, as indicated in Figure 12, so that after the selector has been adjusted longitudinally to register with the desired book, it may be adjusted laterally so as to engage the tabs of the individual leaf desired.

The carriage which supports the selector 22 includes a pair of brackets 26 arranged at opposite sides of the box, and each having an inwardly turned flange 27, engaging underneath the upper side rail 28 of the box. Each bracket 26 is provided with a downward extension 29, to the lower end of which is secured a foot piece 30 embracing a longitudinal guide rod 31 connected at its ends to the legs 11, the foot piece being provided with an antifriction roller 32 adapted to ride along the underside of the rod 31.

A shaft 33 is journaled in the brackets 26 near one side thereof and extends transversely above the box 10, and is provided with spur gears 34 and 35 meshing with the respective racks 36 and 37 formed on the upper side edges of the box. Thus the shaft 33 forms a support for the brackets 26 at one side, and by means of the crank 38 the spur gears 34 and 35 may be caused to travel along the racks and adjust the selector carriage longitudinally of the box. Collars 39 and 40 may be secured to the shaft 33, and these collars, in connection with the spur gears 34 and 35, serve to hold the shaft 33 against axial movement, retaining the gears in the plane of the racks, and holding the brackets 26 against the sides of the box so that the rails 28 serve as a guide along which the carriage is longitudinally adjusted.

A second transverse shaft 41 is journaled in the brackets 26 near the opposite sides thereof and spaced from the shaft 33, and on this second shaft are journaled idler pinions 42 and 43, which are also in mesh with the racks 36 and 37, and held against longitudinal movement on the shaft by means of collars 44 and 45, respectively. Pinions 46 and 47 are secured to the shaft 41 adjacent the outer faces of the brackets, and are in mesh with vertical racks 48 and 49 secured to the selector 22, and the shaft 41 may be rotated by means of a crank 50, to adjust the selector vertically. The racks 48 and 49 are held always in mesh with the pinions 46 and 47 by means of guide clips 51 secured to the brackets 26. The downward extensions 29 of the brackets are hollow, and also serve as a housing and guide for the racks 48 and 49. The selector 22 is also provided with a pair of guide rods 52 at each side of the box, and these guide rods are slidable within the tubes 53 secured to the brackets 26 on opposite sides of the downward extension 29, whereby the selector is always held in proper alinement in any position to which it may be adjusted.

A meter 54 is secured by an arm 55 to one of the brackets 26 in proximity to one of the vertical racks 48 or 49, for the purpose of accurately measuring the vertical adjustment of the selector. As shown in Figures 2 and 8, this meter is provided with a stub shaft 56, on which is secured a pinion 57 meshing with the rack 48 inside the housing of the meter 54. The stub shaft 56 is provided with a disc 58 bearing on its circumference digits representing units of vertical adjustment. That is, a vertical adjustment between the distance of two of the lines 17 causes the rotation of the disc 59 through an angle measured by the arc between two adjacent digits. A second disc 59 is journaled within the casing of the meter 54, in the same plane with the disc 58, and provided with pegs 60, one of which is engaged by an arm 51 on the stub shaft 56 at each rotation of the latter. The disc 59, therefore, is rotated through an arc equal to the distance between two of the pegs 60 upon each rotation of the disc 58. According to our decimal system of notation there are ten of the pegs 60, and the circumference of the disc 59 is provided with digits representing tens. The casing of the meter 54 is provided with windows 62, through which the reading may be taken for accurately determining the vertical adjustment of the selector.

The details of the selector 22 will now be described. This selector comprises a transverse bar 63 secured to the upper ends of the racks 48 and 49 on which a yoke 64 is slidably mounted, but prevented from rotational movement about the rod 63 by a key 65, or its equivalent. The yoke includes a pair of spaced arms 66 and 67, between which is a sleeve 68. The arms 66 and 67 at their lower ends carry a spindle 71, on which pairs of gripper arms 69 and 70 are intermediately pivoted, the arms being held against movement longitudinally of the spindle 71 between the arms 66 and 67 and the respective collars 72 secured to the ends of the spindle. The gripper arms 69 and 70 are in the form of bell-cranks having their respective upper portions extending in opposite directions from the pivot, as shown at 69$^a$ and 70$^a$ in Figure 12. The upper corresponding ends of each pair of gripper arms are rigidly connected by rods 73 and 74. A pair of levers 75 and 76 are fulcrumed on the spindle 71 between the arms 66 and 67 of the yoke, and are pivotally connected to the rods 73 and 74 respectively, while the front ends of the levers are provided with finger holds 77 and 78, respectively. It will be noted that the lever 75 is of the first class with its fulcrum intermediate the finger hold 77 and the rod 73, while the lever 76 is of the second class with the rod 74 connected to the lever intermediate the fulcrum and the finger hold 78. Consequently when the finger holds 77 and 78 are moved toward each other both rods 73 and 74 will be moved downwardly to swing the gripper arms 69 and 70 about their pivots to open the jaws. The rods 73 and 74 are connected by springs 79, which are so tensioned as to move the rods 73 and 74 upwardly and toward each other and to normally hold the jaws closed. The jaws have their lower ends turned inwardly, as shown at 80, whereby they are adapted to enter the perforations 21 in the tabs 20 so as to securely retain the same for the purpose of raising the leaf which has been selected.

For the purpose of alining the gripper arms 69 and 70 with the tabs of the individual leaf, which is to be selected from a predetermined book, the sleeve 68 is provided with a forwardly projecting hollow boss 81 having slots 82 therein, within which is a small lever 83, Figures 4 and 14, the latter being pivotally supported at its upper end, and having a lug 84 adapted to engage with any one of the notches 85 formed in the front edge of the bar 63. The lever 83 is normally held with the lug 84 engaging the desired notch by an expansile coiled spring 85ª housed within the boss 81. A finger lever 86 is intermediately pivoted to the lever 75 and provided with a toe 87 engageable with the concave underside 88 of the lever 83. The forward end 89 of the lever 86 extends to a point near the finger holds 77 and 78 of the gripper-actuating levers 75 and 76, so that the lever 86 may be operated to release the yoke 64 simultaneously with the release of the gripper arms 69 and 70, or the gripper arms alone may be actuated after the yoke 64 has been properly positioned.

After the selector has been properly positioned and the desired leaf has been raised to the proper height, the detector, Figures 1, 3 and 15 to 19, is brought into operation to read the combination of perforations on the leaf which gives the desired information. This detector comprises a bar 90 having flanged ends, which are adapted to rest upon the upper side edges of the box 10 within the racks 36 and 37 and may be moved longitudinally along the edges of the box to read the desired information after the selector and detector have been brought into the proper relative position. The detector includes a shoe 92 mounted for sliding adjustment on the bar 90 and retained therein by a face plate 92ª secured to the shoe by screws, or other suitable means. The bar 90 is provided on its underside with a channel 93, on one side of which are spaced notches 94. A plunger 95 is mounted in the shoe 92, and provided with an upstanding lug 96 adapted to selectively engage any one of the notches 94. The plunger 95 is also provided with a downwardly projecting lug 97 adapted to slide in a guide way 98 formed in the shoe to prevent rotation of the plunger. The plunger is normally urged forwardly by an expansile coiled spring 99. When the plunger is pressed rearwardly, the lug 96 enters the channel 93, and the shoe may then be moved longitudinally of the bar 90 until the lug 96 is in position to engage in the desired notch 94. The front face of the bar 90 is provided with marks 100, which may be numbered and read through a sight-opening 101, in the face plate 92ª.

Carried on the slidable shoe 92 is a casing 102 having in its rear wall a row of perforations 103 in which needles 104 are slidably mounted. The shoe also carries an upstanding flange 105 spaced from the wall 102, and also having a row of perforations 106 in alinement with the respective perforations 103, and adapted to support the rear or pointed ends of the needles and to aline the same with the points on the line 17 which is to be read. The front side of the casing 102 is provided with a cover plate 107 having perforations 108 for receiving the front ends of the needles 104, said plate 107 being removably secured by screws 109, or the like. The top wall of the casing 102 is provided with a series of slots 110, which are partially covered by a rearwardly turned flange 111 formed on the upper side of the plate 107. Each needle 104 carries an upstanding arm 112 which projects through one of the slots 110 and is provided with an enlarged head 113, on which is a digit designating the relative position of that needle with respect to the others, as will be seen from Figure 18. Each needle is urged into projected position by an expansile coiled spring 114 acting between the arm 112 and the face plate 107. When the detector is advanced therefore so as to bring the points of the needles into contact with the leaf 12, the needle held by the spring 114 will enter a perforation 19, provided there is such a perforation in alinement with the needle, and if there is no perforation at that point the needle will be pressed backwardly so that its head 113 will be concealed by the flange 111. The digits on those heads 113 which appear, as for instance, the digits 125690, in Figure 18, will indicate the combination of perforations on the leaf at the line 17 which represents the license number of the automobile which is under investigation. Since the needles and the record perforations are quite small in order to conserve space, the casing 102 is preferably formed with upwardly and outwardly sloping walls, as clearly indicated in Figure 17, so that sufficient space may be obtained to permit the use of relatively large heads 113, and thereby make it easier to read the combinations.

In order that the selector mechanism may be held accurately in position while the detector is being used, the flanges 91 on the detector are provided with offset portions 115, Figures 3, 4 and 15, formed on their rear edges with teeth 116 adapted to engage the pinions 42 and 43 when the detector is moved back, and to form a traveling lock for the selector. The flanged ends 91 are also provided with forwardly extending arms 117 having racks 118 formed on their outer extremities and engageable with pinions 119 and 120 journaled on the shaft 33. The pinions 119 and 120 are connected by a plate 121, which forms a backing plate for the leaf to prevent the latter from warping when the detector is applied thereto. That is as soon as the detector is advanced sufficiently for the rack bars 118 to engage the pinions 120 and 121, the latter are partially rotated to swing the backing plate from the position shown in Figure 3 and in dotted lines in Figure 4, to the position shown in full lines in Figures 4 and 10. The backing plate 121 is formed with perforations 121ª, which are adapted to register with the perforations 19 on the leaf so as not to impede the advance of the needles.

Means are also provided for locking all of the leaves in the box, and for releasing at one time only those leaves the tabs of which are in alinement, or in other words every tenth leaf. For this purpose each leaf is provided on its lower edge with nine notches 122 and one notch 123, the notch 123 being partially closed by a lug 124. Ten crankshafts 125 are rotatably mounted in the ends of the box and have elongated crank portions 126, operable in the notches 122 and 123. Each shaft is provided at its front end with a crank pin 127, pivotally connected to the lower end of a plunger 128. The plungers are preferably housed within a housing plate 129 secured to the front end of the box, and are provided at their upper ends with keys 131 bearing digits to indicate the crank shaft to which each is connected. The plungers are all normally held in their uppermost position by individual springs 130, so that the lug 124 of each leaf is engaged by the crank portion 126 of one of the crank shafts. When one of the plungers 128 is depressed, the crank shaft connected therewith is rocked to the right to swing the crank portion 126 away from the lug 124 so that the leaf may be raised. It is to be understood that by the depression of one plunger, therefore, one leaf of each book is released so that it may be raised by the selector, while the adjacent leaves will be held locked.

The operation of the selector and detector will now be described. Whenever a policeman, detective, or other person wishes to determine the record of an automobile bearing a given license number, he will immediately communicate with the office where the record is kept. The clerk there will, by operating the crank 38, move the selector longitudinally of the box until the gripper arms are directly above the book containing records of license numbers beginning with the first two digits of the number to be ascertained, as indicated on the gage 23. The yoke 64 will be moved laterally, and the lever 83 be brought into engagement with the notch 85 corresponding to the third digit of the desired number. The gripper arms will now be lowered by the rotation of the crank arm 50, and by the manipulation of the levers 75 and 76 will be engaged with the leaf corresponding to the first three digits of the number. The desired leaf will now be unlocked by depressing the proper plunger 128. The crank arm 50 will now be rotated to again raise the gripper arms raising the desired leaf therewith until the digits appearing through the windows 62 correspond to the fourth and fifth digits of the desired number. The plunger 95 will now be pressed, and the detector shoe 92 moved along the bar 90 until the last digit of the number appears through the sight-opening 101. The detector needles 104 are now in alinement with the record line 17 of the desired number, and the detector will be advanced to bring the points of the needles against the leaf, whereupon the combination of digits indicating the desired record may be read from the heads 113, which appear in front of the flange 111.

The mechanism herein described may be manipulated in much less time than it would take to find the record in an ordinary book, and with the present system a small box, ten inches long, will contain the record of one million automobiles, as will be understood from the foregoing description.

It is to be understood, however, that the invention in its broadest aspect does not necessitate the use of the mechanism above described. In fact the records may be kept on sheets of paper, ruled after the manner of graph paper, and kept in the shape of a card index or book, or in any other manner desired. Either dots or perforations may be used for recording the required information. With such a record, of course the tabs may be omitted and each leaf bearing one or ten thousand records, will be located by the order of its occurrence in the book or ledger. The desired number may be easily found by means of an ordinary ruler graduated to correspond to the horizontal and vertical lines on the leaves of the card index or book.

Either one or more dots or perforations may be used to give the desired information in connection with each serial number, and if the needle detector is used one or more needles will be required.

It will be understood that a great many other modifications may be made in the mechanism herein shown and described without departing from the principle of the invention as herein claimed. It will also be apparent, that the system is adapted for keeping any kind of records, and particularly where certain data is required to be kept in connection with a very large number of articles. It is therefore my intention to include all such modifications within the scope of the appended claims.

What is claimed is:

1. In a device of the character described, the combination of a receptacle, a plurality of leaves arranged within the receptacle in definitely measured positions with respect to the longitudinal dimension of the receptacle and having upstanding tabs, and means for engaging the tabs of a predetermined leaf and raising it above the other leaves.

2. In a device of the character described, the combination of a receptacle, a plurality of leaves arranged vertically within the receptacle in definitely measured positions with respect to the longitudinal dimension of the receptacle and having upstanding tabs, means for locking said leaves, means adapted to unlock a predetermined leaf while the adjacent leaves remain locked, and means for engaging the tabs of said predetermined leaf and raising it above the other leaves.

3. In a device of the class described, the combination of a rectangular box, a plurality of leaves arranged side by side within the box in definitely measured positions, a carriage mounted for adjustment longitudinally of the box, means for gaging the position of the carriage, and means supported by the carriage for engaging a predetermined leaf and raising the same above the other leaves.

4. In a device of the character described, the combination of a rectangular box, a plurality of leaves arranged vertically side by side in definitely measured positions with respect to the longitudinal dimension of the box and having upstanding tabs, means for locking said leaves, a carriage mounted for longitudinal adjustment with respect to the box, means for releasing the locking means to unlock a predetermined leaf, and means supported by the carriage for engaging the tabs of the unlocked leaf and raising it above the other leaves while the adjacent leaves remain locked.

5. In a device of the character described, the combination of a rectangular box, groups of leaves arranged vertically side by side within the box and each having upstanding tabs, the tabs of the individual leaves of each group being progressively offset, and a selector adjustable longitudinally and transversely of the box to select a predetermined leaf, said selector including means for engaging the tabs of said leaf and raising it.

6. In a device of the character described, the combination of a rectangular box, a plurality of leaves arranged side by side within the box and made up of groups, each leaf having upstanding tabs, the tabs on the individual leaf in each group being progressively offset and in registry with the corresponding tabs in the other groups, means for locking all of the leaves in the box, means for releasing the unlocking means for unlocking a single leaf in each group, a selector adjustable longitudinally and transversely of the box to bring it into position to engage the tabs of the unlocked leaf in a predetermined group, and means for actuating the selector to raise said leaf while the adjacent leaves remain locked.

7. In a device of the character described, the combination of a receptacle, a plurality of leaves arranged within the receptacle and having upstanding tabs, said box having its longitudinal sides formed with racks on their upper edges, a carriage slidably mounted on the box and having a shaft and pinions engaging said racks and rotatable to move the carriage longitudinally of the box, means for gaging said longitudinal movement so as to determine the position of the carriage above a predetermined leaf, means supported on the carriage for engaging the tabs of said leaf and raising it above the others.

8. In a device of the character described, the combination of a receptacle, a plurality of leaves arranged vertically side by side within the receptacle and having upstanding tabs, means for locking said leaves, racks formed on the longitudinal side edges of the box, a carriage mounted to slide longitudinally of the box and having a shaft with pinions engaging said racks, said shaft being rotatable to move the carriage longitudinally, means for gaging said longitudinal movement so as to determine the position of the carriage above a predetermined leaf, means supported on the carriage for engaging the tabs of said predetermined leaf and raising it above the others, and means for releasing the locking means to unlock said leaf to permit it to be raised while the adjacent leaves remain locked.

9. In a device of the character described, the combination of a rectangular box, a plurality of leaves arranged vertically side by side within the box and having upstanding tabs, a carriage longitudinally slidable on the box, means for gaging the position of the carriage, a selector having vertical racks guided for vertical movement on said carriage, a shaft on said carriage having pinions meshing with said racks, and means carried by the selector for engaging the tabs of a leaf to raise it above the other leaves.

10. In a device of the character described, the combination of a box, a plurality of leaves arranged vertically side by side within the box, each leaf having upstanding tabs, means for locking said leaves, said box having its longitudinal sides formed with racks on their upper edges, a carriage slidably mounted on the box and having a shaft with pinions engaging said racks and rotatable to move the carriage longitudinally of the box to bring it above a predetermined leaf, a selector having vertical racks guided for vertical movement on said carriage, and a second shaft on the carriage meshing with the vertical racks and rotatable to adjust said selector vertically, said selector including means for engaging the tabs of a predetermined leaf and raising it, and means for releasing the locking means for unlocking said leaf while the adjacent leaves remain locked.

11. In a device of the character described, the combination of a rectangular box, a plurality of groups of leaves arranged within the box, each leaf having upstanding tabs, the tabs on the individual leaves of each group being progressively offset and in registry with the tabs of the corresponding leaves of the other groups, a carriage adjustable longitudinally of the box, means for gaging the adjustment of the carriage so as to position the same above a predetermined group of leaves, selector adjustable laterally on the carriage to bring it above the tabs of a predetermined leaf in the group, and means for lowering and raising the selector, said selector including means for engaging the tabs of a predetermined leaf and raising it above the others.

12. In a device of the character described, the combination of a receptacle, a plurality of leaves arranged side by side in vertical position within the receptacle, means for locking said leaves, said leaves being divided into a plurality of equal groups, each leaf having upstanding tabs and the tabs on the individual leaves of each group being progressively offset, a carriage adjustable longitudinally of the box, a gage for positioning the carriage over a predetermined group, a selector movable laterally on the carriage to bring it above the tabs of a predetermined leaf in the group, means for lowering and raising the selector, and means for causing the selector to engage the tabs of a predetermined leaf and to raise the same above the others, and means for releasing the locking means for unlocking said predetermined leaf to permit it to be raised while the adjacent leaves remain locked.

13. In a device of the character described, the combination of a rectangular box, a plurality of leaves arranged in groups within the box, each group containing a predetermined number of leaves, each leaf having as many notches cut in its lower edge as there are leaves in a group, the notches of all the leaves being in alinement with the corresponding notches in the other leaves, shafts journaled in the ends of the box and having an elongated crank traversing the respective alined recesses, each leaf having a lug extending partially across one of the recesses, whereby the crank may be swung to lock or unlock the leaf, the lugs of the several leaves in a group being associated with successive recesses, and in alinement with the lugs of the corresponding leaves of the other groups.

14. In a device of the character described, the combination of a plurality of leaves normally arranged in groups in side-by-side relation to each other, means for locking said leaves in their normal positions, each group containing an equal number of leaves, means for releasing the locking means for unlocking the corresponding leaves of each group while all the other leaves remain unlocked, and means for selecting the unlocked leaf of a predetermined group and raising the same above the others.

15. A recording device comprising one or more leaves divided horizontally and vertically into a plurality of spaces, each space being equally subdivided by horizontal and vertical lines, the points of intersection of said lines bearing certain data regarding articles designated by serial numbers, the position of a group of said points determining the particular serial number to which it relates, and means for gaging and identifying the points which relate to a predetermined serial number.

16. In a device of the character described, the combination of a receptacle, a plurality of leaves arranged within the receptacle, each leaf having perforations therein to record certain data, means for raising a predetermined leaf above the others, a detector having means adapted to engage the leaf to indicate the combination of perforations within a predetermined space therein, means for advancing the detector into operative relation to the leaf, a backing plate, and means for raising the backing plate against the back of the leaf simultaneously with the advance of the detector.

In testimony, that I claim the foregoing as my own, I have hereto affixed my signature.

CHARLES C. KRUSE.